(12) United States Patent
Schunck et al.

(10) Patent No.: US 7,044,728 B2
(45) Date of Patent: May 16, 2006

(54) INJECTION MOLDING APPARATUS AND LINEAR ACTUATOR WITH POSITION SENSOR THEREFOR

(75) Inventors: Ralf Schunck, Goethestrasse (DE); Hans Hagelstein, Bischweier (DE)

(73) Assignee: Mold-Masters Limited, Georgetown (CA)

( * ) Notice: Subject to any disclaimer, the term of this patent is extended or adjusted under 35 U.S.C. 154(b) by 202 days.

(21) Appl. No.: 10/680,220

(22) Filed: Oct. 8, 2003

(65) Prior Publication Data

US 2004/0115295 A1 Jun. 17, 2004

(30) Foreign Application Priority Data

Oct. 11, 2002 (DE) ................. 102 47 574

(51) Int. Cl.
*B29C 45/23* (2006.01)
(52) U.S. Cl. ..................................... 425/562; 425/564
(58) Field of Classification Search ............... 425/562, 425/563, 564, 565, 566
See application file for complete search history.

(56) References Cited

U.S. PATENT DOCUMENTS

| | | |
|---|---|---|
| 5,055,026 A | 10/1991 | Gordon |
| 5,149,547 A | 9/1992 | Gill |
| 5,531,581 A | 7/1996 | Donnell, Jr. |
| 5,556,582 A | 9/1996 | Kazmer |
| 6,001,296 A | 12/1999 | Roddenburgh et al. |
| 6,129,541 A | 10/2000 | Takada |
| 6,179,604 B1 | 1/2001 | Takada |
| 6,294,122 B1 | 9/2001 | Moss et al. |
| 2002/0094355 A1 | 7/2002 | Sattler et al. |
| 2002/0106419 A1 | 8/2002 | Sattler et al. |
| 2002/0114860 A1 | 8/2002 | Sattler et al. |
| 2003/0072833 A1 | 4/2003 | Olaru |

FOREIGN PATENT DOCUMENTS

| | | |
|---|---|---|
| DE | 3833220 C2 | 4/1990 |
| EP | 0 936 048 | 8/1999 |
| EP | 01223018 A1 | 7/2002 |
| EP | 1223019 A1 | 7/2002 |
| EP | 1223020 A1 | 7/2002 |
| WO | WO 02/066224 A1 | 8/2002 |
| WO | WO-03/031146 A1 | 4/2003 |

OTHER PUBLICATIONS

D. Kazmer et al., "Multi-Cavity Pressure Control in the Filling and Packing Stages of the Injection Molding Process," Polymer Engineering and Science, 1997, 37(11): p. 1865-1879.

Web page from Dwyer wesite directed toward a "Valve Position Sensor" printed Feb. 23, 2004 <http://www.dwyer-inst.com/htdocs/valves/qsseriesvps.cfm> (2003).

*Primary Examiner*—Tim Heitbrink
(74) *Attorney, Agent, or Firm*—Sterne, Kessler, Goldstein & Fox P.L.L.C.

(57) ABSTRACT

The present invention relates to an injection molding apparatus having a linear actuator for a control valve with a position sensor and a cooling assembly, wherein the position sensor is integrated into or positioned proximal to the cooling assembly.

20 Claims, 7 Drawing Sheets

INJECTION MOLDING APPARATUS AND LINEAR ACTUATOR WITH POSITION SENSOR THEREFOR

CROSS-REFERENCE TO RELATED APPLICATIONS

This application claims priority under 35 U.S.C. § 119 to German Patent Application No. 10247574.1, filed Oct. 11, 2002.

FIELD OF THE INVENTION

The present invention relates to an injection molding apparatus having a linear actuator to control a valve pin with a position sensor and a cooling assembly.

BACKGROUND OF THE INVENTION

Injection molding of plastic parts is a common manufacturing practice. Various articles of commercial value such as plastic bottles, toothbrushes, and children's toys, are made using well-known injection molding techniques. Injection molding generally involves melting plastic then forcing the melt stream at high temperatures and pressures through one or more gates into a mold cavity. The melt cools in the shape of the mold cavity, which is opened to eject the finished part.

A valve gated injection molding apparatus is well known, as shown and described in U.S. Pat. No. 4,380,426 to Gellert, incorporated herein in its entirety by reference thereto. Usually a valve pin has a cylindrical or tapered front end and reciprocates between a retracted open position and a forward closed position in which the front end is seated in a gate. In some applications, the valve pin functions in the reverse direction and closes in the retracted position.

Valve-gated mechanisms are, however, typically designed to open and close the gates in a binary fashion, i.e., the gate is either open or it is closed without allowing for a partially opened scenario in which the melt flow rate or amount is controlled. In some manufacturing processes, the ability to control the melt stream during the shot is highly desirable. For example, in a multi-gated system, wherein a single mold cavity is fed melt through multiple gates, a common manifold serves all of the gates. However, a "knit line" is formed at the interface where melt flowing from one gate meets melt flowing from another gate. Even though all of the gates are commonly fed, the ability to control the flow rate through each gate individually would allow the designer to control the location of the knit line for structural or aesthetic purposes.

Another instance in which control over the melt stream flow is desirable is when a number of parts are simultaneously molded. Each mold cavity is fed melt by an individual gate. However, the mold cavities are not necessarily all the same size, such as when components of an interlocking piece are simultaneously molded, as in the sections of a cellular telephone casing or the base and cover of a packaging system. The common melt stream is important, so that the plastic characteristics are as uniform as possible between the pieces; however, as the pieces are not of a uniform size, one mold customarily takes longer to fill than the other(s). If the larger mold cavity could be filled more quickly, then both parts would be ready for ejection from the mold at the same time.

Various methods exist in the art to provide this type of control over the melt stream. The gates could be individually re-tooled for every new product, but this is expensive and time-consuming. U.S. Pat. No. 5,556,582 to Kazmer et al., incorporated herein in its entirety by reference thereto, describes a system wherein an adjustable valve pin is located in the gate, which is located in the manifold. The valve pin can be dynamically adjusted by a computer according to pressure data read at or near the injection point in the mold. The valve pin has a tapered head and the melt channel has a complementary geometry, such that the melt stream is slowed to an eventual full stop. If multiple valves are used, each is independently controlled. A hot runner nozzle is not provided. Also, as the system is used, the repetitive action of the valve pin produces significant wear on the tip of the valve pin. This wear, a result of repeated impact with the mold cavity, eventually reduces the cross-sectional diameter of the tip of the valve pin. As the tip of the valve pin is also used for flow control purposes, the ability of the system to control the flow effectively is diminished or eliminated over time.

Another system is described in U.S. Patent Application Pub. No. 2002/0121713 to Moss et al., incorporated herein in its entirety by reference thereto. In this publication, a valve pin is located in the manifold, with a tapered valve pin head disposed at the inlet point to a hot runner nozzle. The melt channel at the inlet point has a corresponding geometry to the tapered pin head, such that when the pin head is pushed into the inlet, the melt stream slows to an eventual stop.

Yet another system is described in PCT International Publication No. WO 01/21377 to Kazmer et al., incorporated herein in its entirety by reference thereto. In this publication, the manifold includes "shooting pot" technology. A portion of the melt stream is diverted from the manifold melt channel into a separate compartment or "well". Disposed within this well is an actuated ram, which can be positioned to seal the opening of the well. A nozzle is located downstream of the well. The flow of melt through a mold gate orifice is controlled by an actuated valve pin. When the melt stream is introduced into the manifold melt channel, the valve pin is seated within the mold gate orifice to prevent flow into a mold cavity. The ram is located in a retracted position so that a volume of melt from the melt stream may be diverted into the well and contained therein. To start the shot, a gating mechanism located upstream from the well closes the manifold melt channel, thereby preventing the introduction of new melt into the well. The valve pin is unseated from the mold gate orifice, and the ram is moved forward at a first velocity to force melt into the mold cavity. A system of pressure sensors measures the pressure in the system and compares that pressure reading to a target pressure profile. If greater pressure is required, the ram velocity is increased. Alternatively, if lesser pressure is required, the ram velocity is slowed. When the ram reaches its lowermost position, the mold cavity is full, and the mold gate orifice is closed. Through this manipulation of the ram velocity, the flow rate of the melt stream can be controlled. This control over the melt stream requires completely closing off of one portion of the manifold melt channel in order to manipulate the melt stream in another portion thereof.

In many injection molding devices, the flow of the melt through the gate into the mold cavity is controlled by a valve unit. Such valve units consist in general of a linear actuator and of a valve pin, which passes through the hot runner manifold and extends up and into the sprue opening. For opening and closing the gate the valve pin is moved backward and forward by the actuator. The actuator of the valve unit is arranged at the side of the manifold opposite the mold cavity, generally above the manifold. In certain applications, the valve pin is moved by a piston arranged in the actuator, the piston being mostly driven hydraulically or pneumatically.

For controlling the movements of the actuator, the position of the valve pin can be measured, for example, by a position sensor and transmitted to a control unit. In the case where a non-contact position sensor is used, the high temperatures of the hot runner manifold makes it difficult to determine accurately the position of the valve pin with respect to the area of the gate. Further, position sensors often fail to function at higher temperatures. For example, some position sensors fail at temperatures as low as around 80° C. to around 120° C. Therefore, there is a need to protect the position sensors used in conventional valve-controlled injection molding devices from the heat generated by the hot runner manifolds

SUMMARY OF THE INVENTION

It is the object of the present invention to improve the actuator for a valve unit of an injection molding apparatus. This object is achieved in an actuator of the above-mentioned type in that the position sensor is integrated into or near the cooling assembly.

By having a linear actuator with a position sensor integrated into the cooling assembly according to the present invention, the stress created on the position sensor by high temperatures is reduced, whereby the service life of the position sensor is increased. An increase in the service life of the position sensor yields an improved operational reliability together with reduced failure frequency and standstill times caused by the position sensor. Due to the cooling of the position sensor, it is also possible to use temperature sensitive sensors for querying the valve pin position.

In the present invention, a control valve, including an actuator, is arranged in a hot runner manifold. The actuator is a cylinder-piston unit, and a cooling assembly, designed as a cooling plate, is arranged between the cylinder-piston unit and the hot runner manifold. The cooling plate can cool a position sensor by integration of the position sensor in the cooling plate, which is arranged between cylinder-piston unit and manifold, thus separate cooling of the position sensor can thereby be avoided. For example, the position sensor may be arranged in the cooling plate for an optimum cooling of the position sensor by the cooling plate.

According to one embodiment, the position sensor sends signals for a fully opened and a fully closed position of the control valve to a control unit. The control unit controls the actuator of the valve unit depending upon the transmitted information regarding the actuator's position.

To permit an improved control of the actuator, the position sensor may transmit intermediate positions of the control valve to the control unit. Such a control of the actuator, which is improved by the transmission of intermediate positions, helps to avoid an unnecessary pneumatic or hydraulic pressure build-up for moving the valve pin.

Preferably, the position sensor may be designed as an inductive sensor. Inductive sensors have the advantage that they have no mechanically moving parts. Further, they can be made highly resistant to wear, and are thus suited for a long service life and, nevertheless, can be offered at a low price by many manufacturers.

In another embodiment, the temperature sensitive sensors are removed from the cooling assembly and placed proximal thereto to avoid possible contact with the melt, but are still close enough to the cooling assembly to take advantage of the temperature control provided by the proximal cooling assembly.

DETAILED DESCRIPTION OF THE PREFERRED EMBODIMENTS

Figure 1:
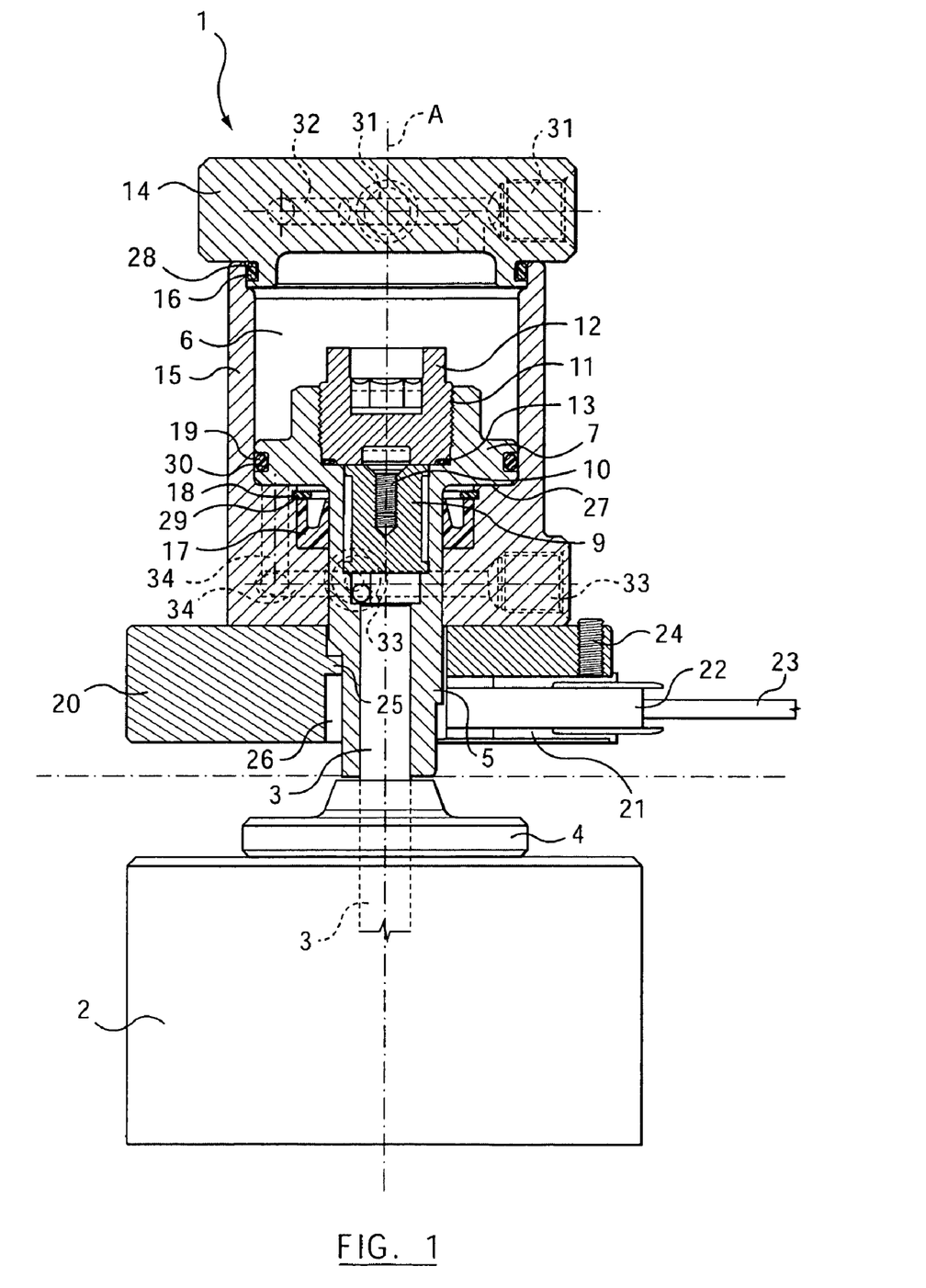
FIG. 1 is a sectional side view of an actuator according to the present invention for valve-controlled injection molding devices, in a closed valve position.

An embodiment of the present invention shall now be described in more detail with reference to the figures. A linear actuator 1 for a valve unit, as shown in FIG. 1, is arranged above the hot runner manifold 2 of an injection molding apparatus. The valve pin 3 extends from the actuator 1 through a valve guide 4, which is connected to manifold 2. The valve pin 3 continues into the manifold 2 and up to a gate (not shown) of the injection molding apparatus. The valve pin 3 is connected to a valve piston 5, which is movably arranged in a cylinder chamber 6 in the actuator 1.

The valve piston 5 comprises a disc-like piston member 7 which separates the cylinder chamber 6 in a vertical direction relative to axis A into an upper and lower part, as well as an elongated cylinder shaft 8. The cylinder shaft 8 is here designed as a multistage hollow cylinder with inner diameters tapering towards the manifold 2, the cylinder shaft 8 accommodates the valve pin 3 in the area directed towards the manifold 2.

A spacer 9 places the valve pin 3 in the cylinder shaft 8. The spacer 9 is fixedly arranged in the cylinder shaft 8 by a screw 10. The screw 10 is accessible in the disc-shaped piston member 7 through an opening 11 arranged opposite to the cylinder shaft 8. The opening 11 is provided with an internal thread which has screwed thereinto a screw 12 which together with a sealing ring 13 arranged at the end side on the screw 12 seals the cylinder shaft 8 against the cylinder chamber 6. The head of screw 12 projects beyond the upper edge of the disc-shaped piston member 7. The valve pin 3, the cylinder chamber 6, the valve piston 5, with disc-shaped piston member 7 and elongated cylinder shaft 8, the spacer 9 and the screws 10 and 12 are each arranged to be coaxial with axis A.

The cylinder chamber 6 is defined by a cylinder head 14 at the upper end side opposite the cylinder shaft 8. A sealing ring 16 seals the cylinder chamber 6 against the environment between the cylinder wall 15 of the cylinder chamber 6 and the cylinder head 14. The sealing ring 16 is arranged in a surrounding groove 28 in the cylinder head 14.

A cylinder shaft seal 17 seals the cylinder chamber 6 against the environment at the lower end side of the cylinder chamber 6. The cylinder shaft seal 17 is held by a retaining ring 18 supported in a groove 29 in the cylinder wall 15. Since the cylinder shaft seal 17 and the retaining ring 18 have a smaller outer diameter than the inner diameter of the cylinder chamber 6, the cylinder chamber 6 tapers in the area of the cylinder shaft seal 17 and the retaining ring 18. Cylinder shaft 8 is positioned within the cylinder shaft seal 17 and is axially movable with respect to the cylinder shaft seal 17.

The disc-shaped piston member 7 of the valve piston 5 comprises a groove 30 which extends on the outer periphery and has arranged therein a piston seal ring 19, which separates the upper and lower parts of the cylinder chamber 6 from one another.

A cooling plate 20 is externally arranged beneath the bottom portion of cylinder wall 15. The cooling plate 20 is provided with an opening 21 which has arranged therein a position sensor 22 which is connected via the connection line 23 to a control unit (not shown) of the actuator 1. The position sensor 22 is fixed in the opening 21 by a stud screw 24, thereby permitting an easy removal of the position sensor 22 without disassembly of the actuator 1. The opening 21 radially extends from the outer circumference of the cooling plate 20 into a central area of the cooling plate 20 within which the cylinder shaft 8 is arranged. The cooling plate 20 is equipped in the central area with a nib 25 which engages a groove 26 extending in an axial direction in the cylinder shaft 8 and serves as a guide for the cylinder shaft 8.

The cylinder head 14 has incorporated therein two lateral connection pieces 31 provided with internal threads for connecting hydraulic or pneumatic conduits (not shown), which are connected via conduit 32 to the upper part of the cylinder chamber 6. Likewise, the lower portion of the cylinder wall 15 has incorporated therein two further connection pieces 33 also for connecting hydraulic or pneumatic conduits (not shown), which are connected via a conduit 34 to the lower part of the cylinder chamber 6.

The valve piston 5 in FIG. 1 rests on a collar 27, which is a portion of the cylinder chamber 6 at the transition to the tapering part of the cylinder chamber 6. In this position, the valve pin 3 is fully extended. The upper part of the cylinder chamber 6 is filled with hydraulic liquid or air. A lower end of the cylinder shaft 8 is positioned outside the cooling plate 20 and extends fully into the area proximal to the position sensor.

Figure 2:
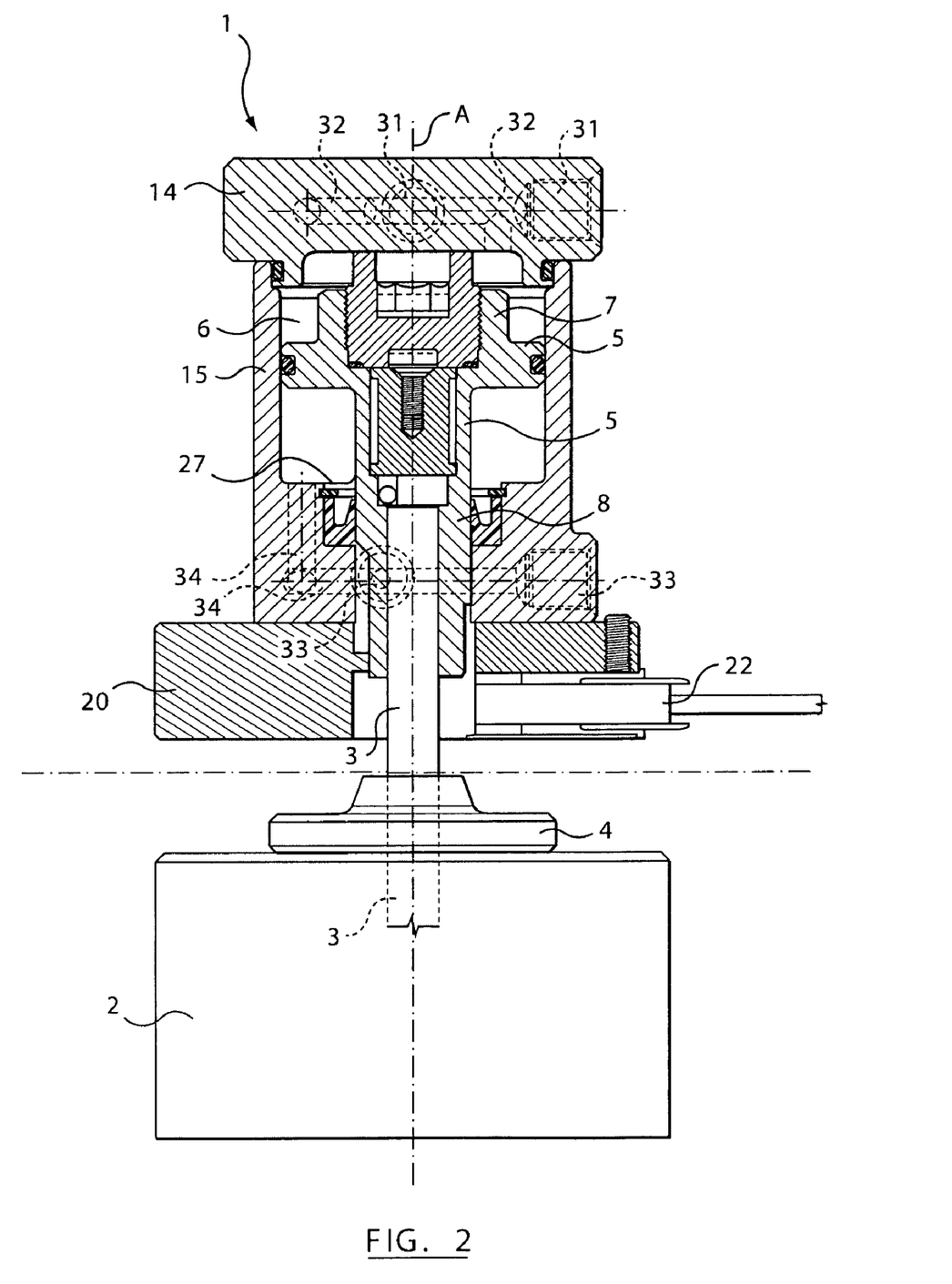
FIG. 2 is a sectional side view of the actuator shown in FIG. 1, in an opened valve position.

FIG. 2 shows the actuator 1 with a fully retracted valve pin 3. The screw 12 touches the inner end face of the cylinder head 14. The lower part of the cylinder chamber 6 is fully filled with a hydraulic liquid or air. The lower end of the cylinder shaft 8 is positioned above an upper edge of opening 21 which houses the position sensor 22, so that the cylinder shaft 8 is not positioned in the sensing area proximal to position sensor 22.

The function of the inventive actuator 1 as shown in FIGS. 1 and 2 and used for valve-controlled injection molding devices shall now be explained in more detail. The position of the actuator 1 starts as shown in FIG. 1 with a fully extended valve pin 3, which in this position normally closes the gate of the injection molding apparatus. Hydraulic liquid or air is pressed into the lower part of the cylinder chamber via the hydraulic or pneumatic conduit connected to one of the connection pieces 33. The disc-shaped piston member 7, which separates the lower and upper part of the cylinder chamber 6 from one another, is pressed by the inflowing pressurized hydraulic liquid or air upwards towards the cylinder head 14. The non-pressurized hydraulic liquid or air within the upper part of the cylinder chamber 6 is pressed by the upwardly pressing disc-shaped piston part 7 out of the cylinder chamber 6 via conduit 32 and one of the connection pieces 31. The upward movement of the valve piston 5 is stopped at the least by the abutment of the screw 12 on the cylinder head 14. Together with the valve piston 5, the valve pin 3 is also moving upwards, thereby opening the gate in the injection molding device. The position of the valve pin 3 is sensed by the position sensor 22, which determines the position via the valve shaft 8 connected to the valve pin 3.

When the gate is opening, the lower end of the valve shaft 8 is moving out of the sensing area of the position sensor 22 and into the same again during closing. To extend the valve pin 3, and thus to close the sprue opening, the hydraulic liquid or air within the lower part of the cylinder chamber 6 is first evacuated. Then, the upper part of the cylinder chamber 6 is filled via one of the connection pieces 31 and conduit 32 with pressurized hydraulic liquid or air. The valve piston 5 is pressed downwards, thereby expelling the hydraulic liquid or air within the lower part of the cylinder chamber 6 through the conduit 34 and one of the connection pieces 33 out of the actuator 1. The disc-shaped piston member 7 resting on collar 27 to limit the downward movement of the valve piston 5. The disc-shaped piston member 7 with the piston seal ring 19 hermetically separates the upper and lower parts of the cylinder chamber 6 from one another. Therefore, the pressurized hydraulic fluid or air is prevented from overflowing from the upper part into the lower part of the cylinder chamber 6, or vice versa.

The position sensor 22 may be any type of sensor known to one skilled in the art. Non-limiting examples of such position sensors include inductive, capacitive or mechanical sensors. One skilled the art can appreciate that a variety of sensors are suitable for use as position sensor 22 of the present invention.

Figure 3:
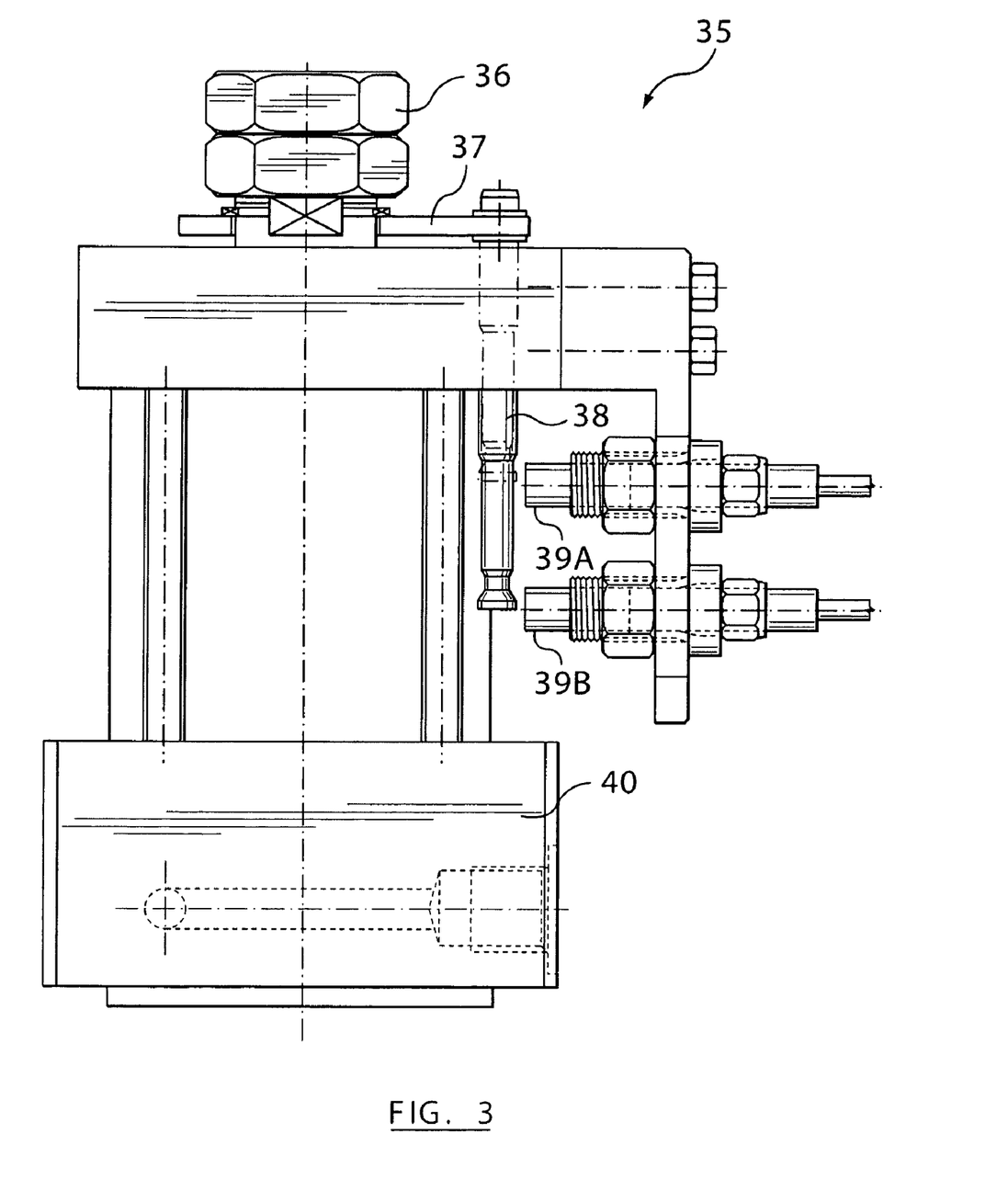
FIG. 3 is a perspective side view of an actuator according to the present invention, in a closed valve position.

FIG. 3 illustrates a perspective view of a linear actuator 35. Linear Actuator 35 includes a connector 36. Connector 36 is coupled to a piston-pin assembly (not shown) and moves correspondingly with the piston-pin assembly. Connector 36 is also coupled to an arm 37, which is attached to a position indicator 38. As the piston-pin assembly and position indicator 38 correspondingly move up and down, sensors 39A and 39B monitor the movement of position indicator 38 to determine the position of the valve pin (not shown). When the valve pin is in an open position, position indicator 38 is at a higher position and only sensor 39A identifies position indicator 38. When the valve pin is in a closed position, the position indicator 38 has moved to a lower position, and, as such, both sensor 39A and sensor 39B identify position indicator 38. Sensors 39A and 39B are in close proximity to a cooling assembly 40, so that cooling assembly 40 provides temperature control for sensors 39A and 39B.

In an alternative embodiment, sensors 39A and 39B may be adjusted to directly identify the position of the piston itself rather than the position of piston indicator 38, as shown in FIG. 3. Sensors 39A and 39B in FIG. 3 are inductive sensors, but they could be another kind of sensor as well.

Figure 4:
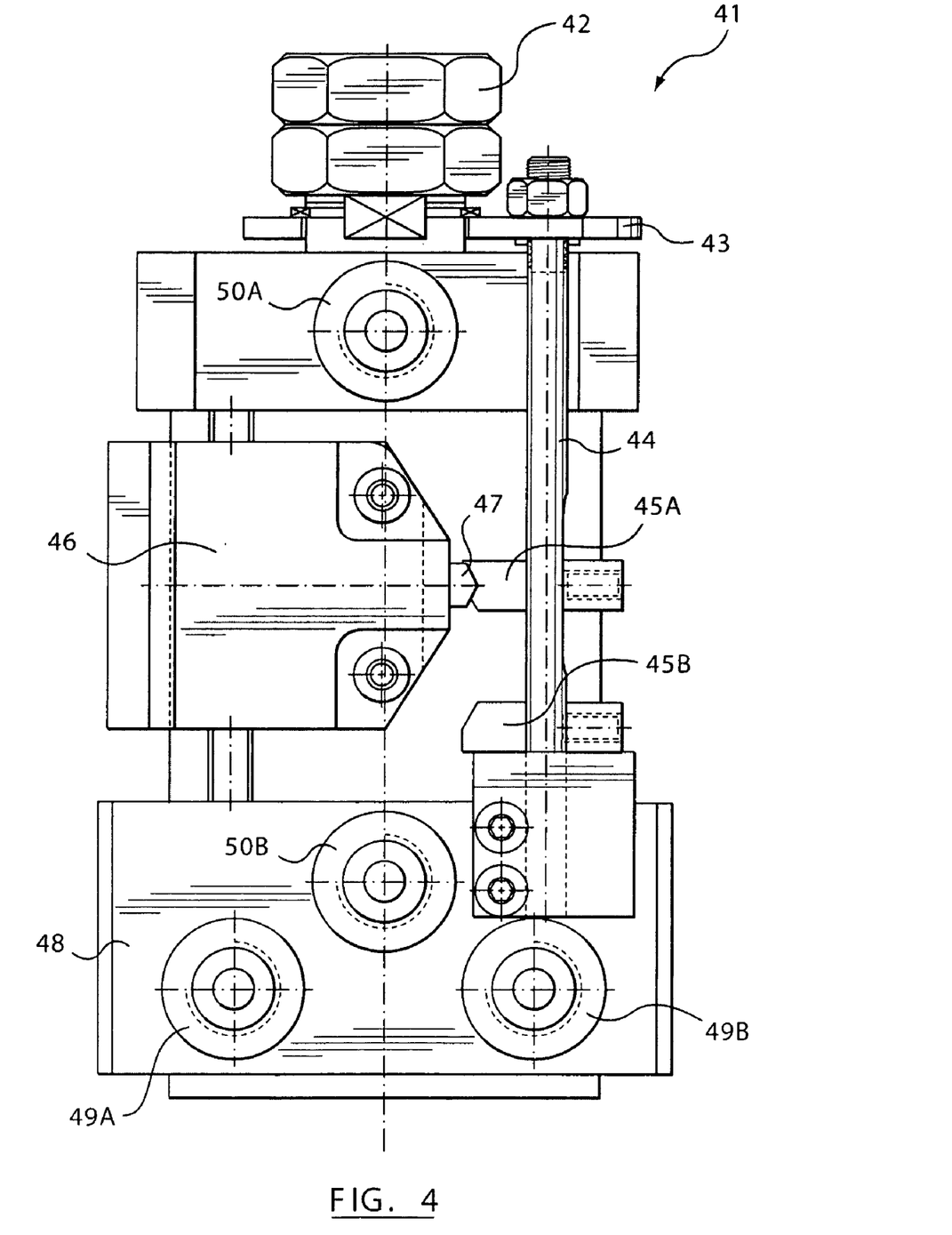
FIG. 4 is a perspective side view of an actuator according to the present invention, in a closed valve position.

FIG. 4 illustrates a perspective view of a linear actuator 41 having a similar design as the embodiment shown in FIG. 3. A connector 42 is coupled to the piston-pin assembly and moves correspondingly with the piston-pin assembly. Connector 42 is also coupled to a first arm 44 via a second arm 43. First arm 44 also moves in a manner corresponding to the piston-pin assembly. First arm 44 comprises a first and second cam 45A and 45B. Linear actuator 41 also comprises a limit switch 46 which is disposed in a fixed position adjacent to said first and second cam 45A and 45B. The limit switch has an conductive extension 47 which alternatively comes into contact with first and second cams 45A and 45B when the first arm 44 moves into its highest and lowest positions, respectively.

First and second cams 45A and 45B are also made of conductive material, such that when the conductive extension 47 contacts first cam 45A, an electric circuit is connected, signaling that the piston is in a lowered position and that the valve is in a closed position. Alternatively, when conductive extension 47 contacts second cam 45B, an electric circuit is connected, signaling that the piston is in a raised position and that the valve is in an open position. The limit switch 46 and the first and second cams 45A and 45B form an electromechanical sensor to indicate the relative positions of the piston.

Both the limit switch 46 and the first and second cams 45A and 45B are positioned proximal to a cooling assembly 48, which utilizes a stream of a cooling fluid entering and exiting through ports 49A and 49B. The cooling assembly controls the temperature surrounding the electromechanical sensor so that the temperature will not exceed the operating temperature of 80° C.

FIG. 4 also illustrates first and second ports 50A and 50B. Port 50A allows hydraulic or pneumatic fluids into the linear actuator to move the piston in a downward direction, which closes the valve. Similarly, port 50B allows hydraulic or pneumatic fluids into the linear actuator to move the piston in an upward direction, which opens the valve.

Figure 5:
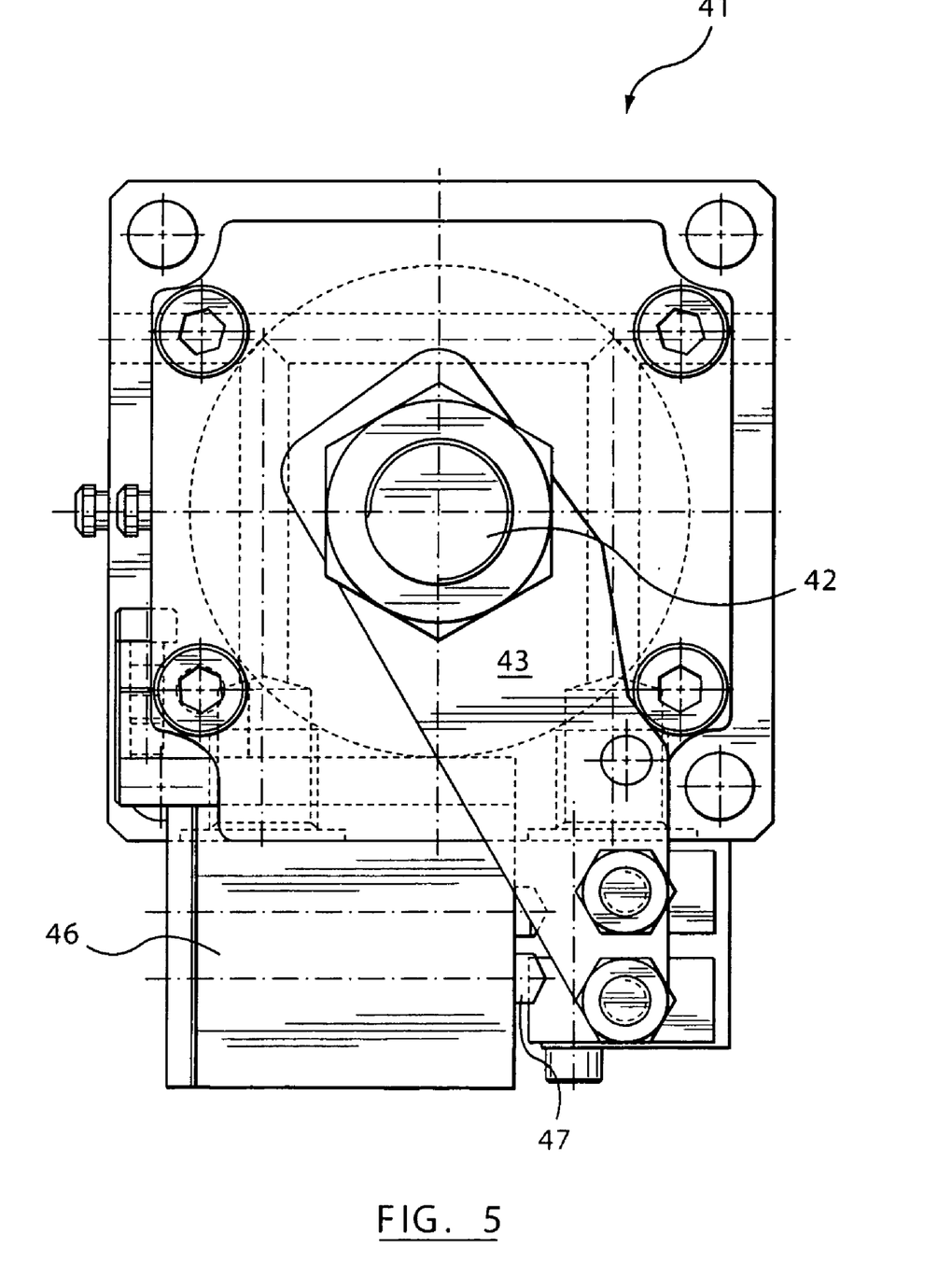
FIG. 5 is a perspective top view of the actuator of FIG. 4.

FIG. 5 is a top perspective view of the linear actuator of FIG. 4 illustrating how limit switch 46 is attached to the exterior of linear actuator 41 and how second arm 43 hold first arm 44 out from the piston-pin assembly, to keep the sensor near the cooling assembly 48 without interfering with the operation of the piston-pin assembly.

Figure 6:
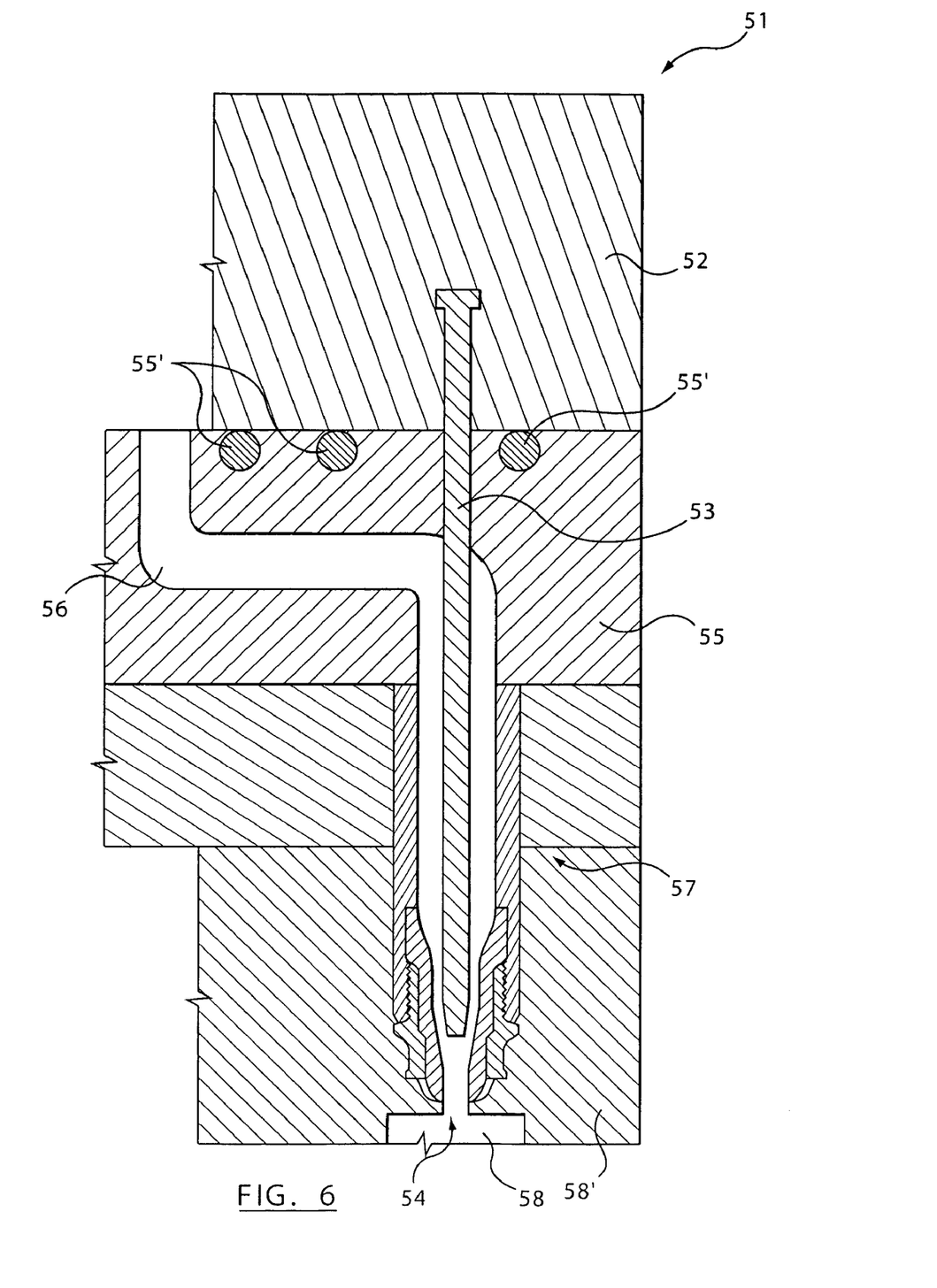
FIG. 6 is a cross-sectional view of an injection molding apparatus having a linear actuator of the present invention.

FIG. 6 is a cross-sectional view of an injection molding apparatus 51 of the present invention incorporating a linear actuator 52 of the present invention. Linear actuator 52 could be any of the linear actuators described above with respect to FIGS. 1–5, or an alternative thereof which would be apparent to one skilled in the art. FIG. 6 further illustrates a valve pin 53 in a raised position such that valve pin 53 opens a valve gate 54. Linear actuator 52 drives valve pin 53 up and down through at least one hot runner manifold 55. Hot runner manifold 55 comprising at least one melt channel 56 through which melt is directed. The temperature of hot runner manifold 55 is controlled by a heating element, such as heating coils 55'. Manifold melt channel 56 is in fluid communication with a melt channel of a nozzle 57 and valve gate 54. Valve gate 54 opens to a mold cavity 58, defined by a mold plate 58'. Mold cavity 58 may be of any size and shape and could comprise more than one cavity.

Figure 7:
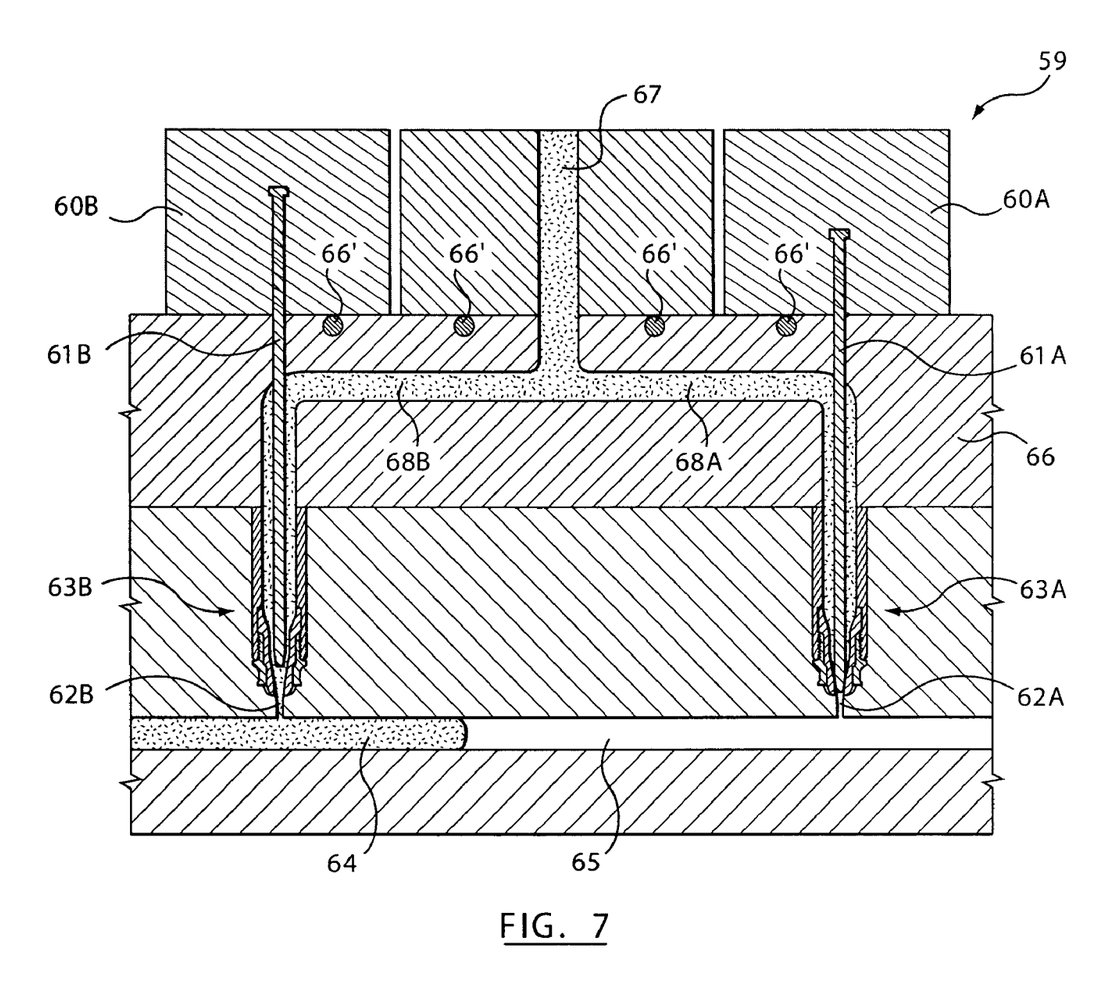
FIG. 7 is a cross-section view of an alternative injection molding apparatus having a linear actuator of the present invention.

FIG. 7 is a cross-sectional view of another injection molding apparatus 59 of the present invention incorporating at least two linear actuators 60A and 60B, which could be any of the linear actuators described above with respect to FIGS. 1–5. Having a series of linear actuators provides more control at the gate. FIG. 7 also illustrates at least two valve pins 61A and 61B, that are driven up and down by linear actuators 60A and 60B, respectively. Valve pins 61A and 61B open and close valve gates 62A and 62B, respectively, which are housed in nozzles 63A and 63B, respectively. The injection molding apparatus 59 of the present invention may have linear actuators 60A and 60B individually controlled, such that valve gates 62A and 62B may be opened or closed individually, as shown in FIG. 7. In FIG. 7, valve pin 61B is raised such that valve gate 62B is opened, allowing melt 64 to enter mold cavity 65 from only one nozzle 63B. Meanwhile, valve pin 61A is lowered, such that valve gate 62A is closed. Thus, no melt enters mold cavity 65 from nozzle 63A.

FIG. 7 also illustrates a hot runner manifold 66 having in one melt channel 67 that splits into two separate melt channels 68A and 68B to feed nozzles 63A and 63B, respectively. The temperature of hot runner manifold 66 is controlled by a heat source, such as heating coils 66'. However, heat sources can be placed in other positions to control the temperature of hot runner manifold 66.

In an alternative embodiment, valve gates 62A and 62B may open into separate mold cavities, which may be of the same or different sizes. In yet another embodiment of the invention, not shown, the linear actuators are used to move a manifold channel valve means, used to control the flow of molten material inside the manifold 66, for example, in the event that the molten material may be different in melt channels 68A and 68B. Position sensors according to the current invention, in which the position sensors are embedded in or proximal to a cooling plate, may also monitor the position of these manifold channel valve means. Furthermore, in order to provide an increased accuracy, the cooling plates according to the current invention may incorporate a temperature sensor, not shown. The temperature sensor, such as a thermocouple, is used to monitor the temperature of each position sensor and prevent overheating or excessive cooling that would affect the accuracy of the position measurement. In another aspect of the invention, one or more valve pins may be actuated by electrical means, not shown, such as an electrical motor, such as that disclosed in U.S. Pat. No. 6,294,122, the disclosure of which is incorporated herein by reference in its entirety.

While the invention has been particularly shown and described with reference to preferred embodiments thereof, it will be understood by those skilled in the art that they have been presented by way of example only, and not limitation, and various changes in form and details can be made therein without departing from the spirit and scope of the invention.

Thus, the breadth and scope of the present invention should not be limited by any of the above-described exemplary embodiments, but should be defined only in accordance with the following claims and their equivalents. Additionally, all references cited herein, including issued U.S. patents, or any other references, are each entirely incorporated by reference herein, including all data, tables, figures, and text presented in the cited references.

The foregoing description of the specific embodiments will so fully reveal the general nature of the invention that others can, by applying knowledge within the skill of the art (including the contents of the references cited herein), readily modify and/or adapt for various applications such specific embodiments, without undue experimentation, without departing from the general concept of the present invention. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance presented herein, in combination with the knowledge of one of ordinary skill in the art.

What is claimed is:

1. An injection molding apparatus, comprising:
   a hot runner manifold comprising at least one melt channel;
   a nozzle fluidly connected to said melt channel of said hot runner manifold;
   a valve gate disposed within said nozzle;
   a valve pin running through at least a portion of said nozzle to open and close said valve gate; and
   a linear actuator connected to said valve pin said linear actuator having a position sensor and a cooling assembly, wherein said position sensor is disposed within said cooling assembly.

2. The injection molding apparatus according to claim 1, further comprising a control unit which receives signals from said position sensor only for one of completely open or completely closed positions of the valve pin.

3. The injection molding apparatus according to claim 2, wherein said position sensor sends signals to the control unit for intermediate positions of the valve pin.

4. The injection molding apparatus according to claim 1, wherein said position sensor is an inductive sensor.

5. The injection molding apparatus according to claim 1, wherein said linear actuator includes a piston and cylinder assembly, wherein said valve pin is coupled to said piston for advancing and retracting said valve pin.

6. The injection molding apparatus according to claim 5, wherein said position sensor is disposed adjacent a portion of said piston and measures the position of said piston.

7. An injection molding apparatus, comprising:
   a hot runner manifold comprising at least one melt channel;
   a nozzle fluidly connected to said melt channel of said hot runner manifold;
   a valve gate disposed within said nozzle;
   a valve pin running through at least a portion of said nozzle to open and close said valve gate; and
   a linear actuator connected to said valve pin said linear actuator having a position sensor and a cooling assembly, wherein said position sensor is positioned substantially proximal to said cooling assembly.

8. The injection molding apparatus according to claim 7, further comprising a control unit which receives signals from said position sensor only for one of completely open or completely closed positions of the valve pin.

9. The injection molding apparatus according to claim 8, wherein said position sensor sends signals to the control unit for intermediate positions of the valve pin.

10. The injection molding apparatus according to claim 7, wherein said position sensor is an inductive sensor.

11. The injection molding apparatus of claim 7, wherein said linear actuator includes a piston and cylinder assembly, wherein said valve pin is coupled to said piston for advancing and retracting said valve pin.

12. The injection molding apparatus of claim 11, wherein said position sensor is disposed adjacent a portion of said piston and measures the position of said piston.

13. The injection molding apparatus of claim 11, wherein said piston is coupled to a position indicator and wherein said position sensor senses the position of said piston by measuring the position of said position indicator.

14. The injection molding apparatus of claim 11, wherein said piston is coupled to a first cam and a second cam, wherein said position sensor senses said first cam when said piston is at its retracted-most position, and said position sensor senses said second cam when said piston is at its extended-most position.

15. A linear actuator for a control valve of an injection molding apparatus, comprising:
   a piston and cylinder assembly;
   a cooling plate having an opening formed therein;
   a position sensor disposed within said opening in said cooling plate, wherein said position sensor measures the displacement of said piston within said cylinder.

16. The linear actuator of claim 15, wherein said position sensor is disposed adjacent a portion of said piston and directly measures the position of said piston.

17. A linear actuator for a control valve of an injection molding apparatus, comprising:
   a piston and cylinder assembly;
   a cooling plate;
   a position sensor disposed substantially proximal to said cooling plate, wherein said position sensor measures the displacement of said piston within said cylinder.

18. The linear actuator of claim 17, wherein said position sensor is disposed adjacent a portion of said piston and directly measures the position of said piston.

19. The injection molding apparatus of claim 17, wherein said piston is coupled to a position indicator and wherein said position sensor senses the position of said piston by measuring the position of said position indicator.

20. The injection molding apparatus of claim 17, wherein said piston is coupled to a first cam and a second cam, wherein said position sensor senses said first cam when said piston is at its retracted-most position, and said position sensor senses said second cam when said piston is at its extended-most position.

* * * * *